United States Patent
Chen

(10) Patent No.: US 11,960,186 B2
(45) Date of Patent: Apr. 16, 2024

(54) LIQUID CRYSTAL DISPLAY PANEL AND DISPLAY DEVICE

(71) Applicants: Huizhou China Star Optoelectronics Display Co., Ltd., Guangdong (CN); TCL CHINA STAR OPTOELECTRONICS TECHNOLOGY CO., LTD., Guangdong (CN)

(72) Inventor: Yani Chen, Guangdong (CN)

(73) Assignees: Huizhou China Star Optoelectronics Display Co., Ltd., Huizhou (CN); TCL China Star Optoelectronics Technology Co., Ltd., Shenzhen (CN)

( * ) Notice: Subject to any disclaimer, the term of this patent is extended or adjusted under 35 U.S.C. 154(b) by 266 days.

(21) Appl. No.: 17/600,252

(22) PCT Filed: Jul. 28, 2021

(86) PCT No.: PCT/CN2021/108974
§ 371 (c)(1),
(2) Date: Sep. 30, 2021

(87) PCT Pub. No.: WO2023/272854
PCT Pub. Date: Jan. 5, 2023

(65) Prior Publication Data
US 2023/0004054 A1    Jan. 5, 2023

(30) Foreign Application Priority Data

Jun. 30, 2021 (CN) .......................... 202110731182.X

(51) Int. Cl.
*G02F 1/1362* (2006.01)

(52) U.S. Cl.
CPC .............................. *G02F 1/136286* (2013.01)

(58) Field of Classification Search
CPC ......... G02F 1/136286; G02F 1/136218; G02F 1/136209; G02F 1/133707
See application file for complete search history.

(56) References Cited

U.S. PATENT DOCUMENTS

| 2011/0128280 A1 | 6/2011 | Tseng et al. |
| 2015/0009459 A1 | 1/2015 | Iwata et al. |
| 2015/0029449 A1* | 1/2015 | Woo .................. G02F 1/133512 349/110 |

(Continued)

FOREIGN PATENT DOCUMENTS

| CN | 101303500 | 11/2008 |
| CN | 104238222 | 12/2014 |

(Continued)

*Primary Examiner* — Jia X Pan

(57) ABSTRACT

A liquid crystal display panel and a display device are provided. A first metal line is disposed on a first substrate of the liquid crystal display panel. An orthographic projection of the first metal line on a pixel electrode covers a first trunk electrode. A voltage difference V1 between the first metal line and a common electrode is small, so that a liquid crystal molecule corresponding to the first metal line does not deflect. In this way, a problem of an insufficient liquid crystal recovery force when the liquid crystal display panel is pressed is resolved, eliminating poor liquid crystal diffusion as a result of pressing and resulting in improving display quality.

12 Claims, 2 Drawing Sheets

(56) References Cited

U.S. PATENT DOCUMENTS

| | | | |
|---|---|---|---|
| 2017/0285393 A1* | 10/2017 | Kim | H01L 29/24 |
| 2018/0088409 A1* | 3/2018 | Lee | H10K 71/50 |
| 2023/0142658 A1* | 5/2023 | Xu | G02F 1/136218 |
| | | | 349/106 |

FOREIGN PATENT DOCUMENTS

| | | |
|---|---|---|
| CN | 104570517 | 4/2015 |
| CN | 105116603 | 12/2015 |
| CN | 106226961 | 12/2016 |
| CN | 107290904 | 10/2017 |
| CN | 109613774 | 4/2019 |
| CN | 110806653 | 2/2020 |
| CN | 112859403 | 5/2021 |

\* cited by examiner

LIQUID CRYSTAL DISPLAY PANEL AND DISPLAY DEVICE

RELATED APPLICATIONS

This application is a National Phase of PCT Patent Application No. PCT/CN2021/108974 having International filing date of Jul. 28, 2021, which claims the benefit of priority of Chinese Patent Application No. 202110731182.X filed on Jun. 30, 2021. The contents of the above applications are all incorporated by reference as if fully set forth herein in their entirety.

FIELD AND BACKGROUND OF THE INVENTION

This application relates to the field of display technologies, and in particular, to a liquid crystal display panel and a display device having the liquid crystal display panel.

With an increasing resolution of a liquid crystal display, a pixel size also decreases. When the pixel size is reduced to a certain extent, such as a pixel size of an 8K liquid crystal display product, a problem of poor liquid crystal diffusion as a result of pressing is prone to occur. A specific mechanism is as follows. When a liquid crystal display panel is beaten by an external force, liquid crystals become disordered. Liquid crystal molecules in a liquid crystal layer that correspond to an upper part of a first trunk electrode of a pixel electrode receive a different recovery force than other positions of the pixel electrode, and therefore cannot return to an original state. As a result, poor liquid crystal diffusion as a result of pressing occurs.

Since an area ratio of a trunk electrode in a pixel electrode in an 8K pixel product is much higher than those in conventional 4 k and 2 k products, the foregoing problem is particularly severe, affecting display quality.

SUMMARY OF THE INVENTION

Technical Problem

Embodiments of this application provide a liquid crystal display panel and a display device, to resolve an existing problem of a liquid crystal display panel such as poor liquid crystal diffusion as a result of pressing.

Technical Solution

Embodiments of this application provide a liquid crystal display panel. The liquid crystal display panel comprises a first substrate and a second substrate disposed opposite to each other. A liquid crystal layer is disposed between the first substrate and the second substrate and comprises a plurality of liquid crystal molecules. A common electrode is disposed on a side of the second substrate facing the first substrate. A plurality of scan lines and a plurality of data lines are disposed on the first substrate. The scan lines and the data lines intersect to define a plurality of pixel units. A pixel electrode is disposed in each pixel unit. The pixel electrode comprises a trunk electrode and a plurality of branch electrodes. The trunk electrode comprises a first trunk electrode and a second trunk electrode intersecting each other. A first metal line is disposed on the first substrate. An orthographic projection of the first metal line on a plane where the pixel electrode is located covers at least part of the first trunk electrode. A voltage difference between the common electrode and the first metal line causes a liquid crystal molecule corresponding to the first metal line to be in an opaque state.

Further, the voltage difference between the common electrode and the first metal line is V1, and $-1\,V \le V1 \le +1\,V$.

Further, a length of the first metal line is 0.5-1 times a length of the pixel electrode.

Further, a width of the first metal line is greater than or equal to a width of the first trunk electrode.

Further, a second metal line configured to shield light leaked at the scan lines is disposed on the first substrate, an orthographic projection of the second metal line on a plane where the scan lines are located falls on the scan lines, a voltage difference between the second metal line and the common electrode is $V_2$, and $V_2 = V_1$.

Further, the first metal line is connected in series with the second metal line.

Further, a third metal line configured to shield light leaked at the data lines is disposed on the first substrate, an orthographic projection of the third metal line on a plane where the data lines are located covers the data lines, the third metal line is connected in series with the second metal line, a voltage difference between the third metal line and the common electrode is $V_3$, and $V_3 = V_1$.

Further, a width of the third metal line is greater than or equal to a width of the data lines.

Further, the first metal line, the second metal line, and the third metal line are disposed in the same layer.

In order to achieve the above objectives, the present invention further provides a display device including the liquid crystal display panel described above.

Beneficial Effects

Beneficial effects of this application are as follows: A first metal line is disposed on a first substrate. An orthographic projection of the first metal line on the pixel electrode covers a first trunk electrode. A voltage difference $V_1$ between the first metal line and a common electrode is small, so that a liquid crystal molecule corresponding to the first metal line does not deflect or deflects by only a small angle. In this way, a problem of an insufficient liquid crystal recovery force of the liquid crystal molecule corresponding to the first trunk electrode when the liquid crystal display panel is pressed, eliminating poor liquid crystal diffusion as a result of pressing and improving display quality.

BRIEF DESCRIPTION OF THE SEVERAL VIEWS OF THE DRAWINGS

The following describes specific implementations of this application in detail with reference to the accompanying drawings, to make the technical solutions and other beneficial effects of this application obvious.

REFERENCE NUMERALS

100. Liquid crystal display panel, 110. First substrate, 111. Scan line, 112. Data line, 120. Second substrate, 121. Common electrode, 130. Liquid crystal layer, 131. Liquid crystal molecule, 140. Pixel unit, 141. Pixel electrode, 142. Outer frame portion, 143. Trunk electrode, 1431. First trunk electrode, 1432. Second trunk electrode, 144. Branch electrode, 151. First metal line, 152. Second metal line, 153. Third metal line, 160. Thin film transistor, 161. Via.

DESCRIPTION OF SPECIFIC EMBODIMENTS OF THE INVENTION

The technical solutions of the embodiments of the present invention are clearly and completely described in the following with reference to the accompanying drawings of the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

A first metal line is disposed on a first substrate of a liquid crystal display panel. An orthographic projection of the first metal line on a pixel electrode covers a first trunk electrode. A voltage difference V1 between the first metal line and a common electrode is small (that is, $-1\ V \le V_1 \le +1\ V$), so that a liquid crystal molecule corresponding to the first metal line does not deflect. In this way, a problem of an insufficient liquid crystal recovery force of the liquid crystal molecule corresponding to the first trunk electrode when the liquid crystal display panel is pressed is resolved, eliminating poor liquid crystal diffusion as a result of pressing and improving display quality. As a typical application, the liquid crystal display panel of the present invention is applicable to a display device, such as an 8K liquid crystal display (LCD).

Figure 1:
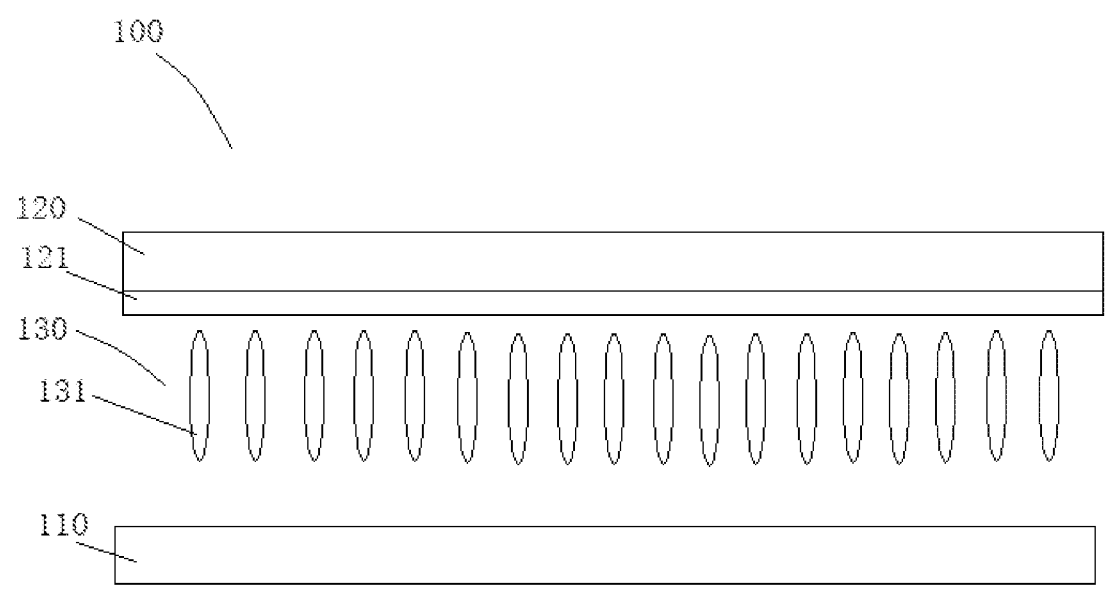
FIG. 1 is a schematic structural diagram of a liquid crystal display panel according to an exemplary embodiment of the present invention.
Figure 2:
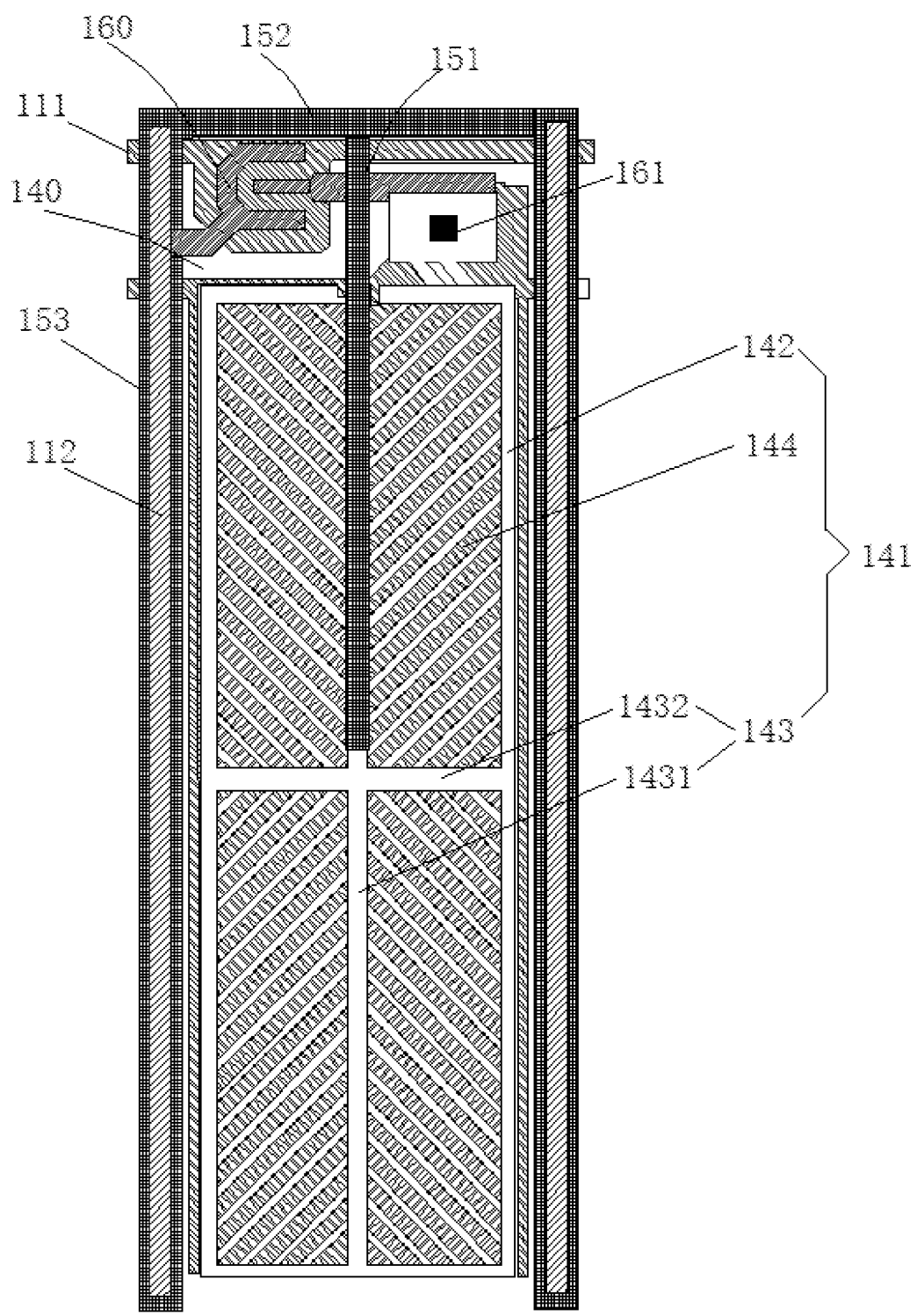
FIG. 2 is a schematic structural diagram of a pixel unit in the liquid crystal display panel according to an exemplary embodiment of the present invention.

In an embodiment of the present invention, as shown in FIG. 1 and FIG. 2, a liquid crystal display panel 100 includes a first substrate 110 and a second substrate 120 disposed opposite to each other. A liquid crystal layer 130 is disposed between the first substrate 110 and the second substrate 120 and includes a plurality of liquid crystal molecules 131. A common electrode 121 is disposed on a side of the second substrate 120 facing the first substrate 110. A plurality of scan lines 111 and a plurality of data lines 112 are disposed on the first substrate 110. The scan lines 111 and the data lines 112 intersect to define a plurality of pixel units 140. A pixel electrode 141 is disposed in each pixel unit 140. The pixel electrode 141 includes an outer frame portion 142 shaped as a frame and a trunk electrode 143 and a plurality of branch electrodes 144 connected into the outer frame portion 142. The trunk electrode 143 includes a first trunk electrode 1431 parallel to the data lines 112 and a second trunk electrode 1432 parallel to the scan lines 111. The first trunk electrode 1431 and the second trunk electrode 1432 intersect each other.

In this embodiment, a first metal line 151 is disposed on the first substrate 110. An orthographic projection of the first metal line 151 on a plane where the pixel electrode 141 is located covers at least part of the first trunk electrode 1431. A voltage difference between the common electrode 121 and the first metal line 151 causes a liquid crystal molecule 131 corresponding to the first metal line 151 to be in an opaque state. That is, in this embodiment, the first metal line 151 is disposed and covers at least half a length of the first trunk electrode 1431, and the voltage difference $V_1$ between the first metal line 151 and the common electrode 121 is 0 V. In other words, a potential on the first metal line 151 is set to be the same as a potential of the common electrode 121, so that a voltage difference across the liquid crystal molecule 131 corresponding to the first metal line 151 is 0. Since the voltage difference is 0, the liquid crystal molecule 131 corresponding to the first metal line 151 does not deflect, and appears in a black and opaque state macroscopically. In this way, the first metal line 151 functions as a black matrix (BM) for shielding light. Therefore, since the liquid crystal molecule 131 corresponding to the first metal line 151 does not deflect, when the liquid crystal display panel 100 is beaten, the liquid crystal molecule corresponding to the first metal line 151 can quickly return to an original state and maintains a black state, so that no light leakage occurs. In addition, since the first trunk electrode 1431 covered by the first metal line 151 is originally in a dark state, an aperture ratio and a transmittance are not additionally sacrificed.

In another embodiment of the present invention, the voltage difference between the first metal line 151 and the common electrode 121 is $-1\ V \le V_1 \le 1\ V$. For example, a voltage applied to the first metal line 151 is 6 V, a voltage applied to the common electrode 121 is 7 V, and therefore the voltage difference between the first metal line 151 and the common electrode 121 is $-1$ V. Alternatively, the voltage applied to the first metal line 151 is 8 V, the voltage applied to the common electrode 121 is 7 V, and therefore the voltage difference between the first metal line 151 and the common electrode 121 is $+1$ V. In this embodiment, the voltage difference between the first metal line 151 and the common electrode 121 is not 0. In this case, the liquid crystal molecule 131 corresponding to the first metal line 151 deflects, but a deflection angle is small, for example, ranges from $-2°$ to $2°$. The liquid crystal molecule 131 still appears in a black and opaque state macroscopically.

In another embodiment of the present invention, a length of the first metal line 151 may be adjusted according to a size of the pixel electrode 141. For example, a length L1 of the first metal line 151 may be 0.5-1 times a length L2 of the pixel electrode 141, provided that the orthographic projection of the first metal line 151 on the pixel electrode 141 covers at least half the length of the first trunk electrode 1431.

Referring to FIG. 2, a width of the first metal line 151 is greater than or equal to a width of the first trunk electrode 1431.

In another embodiment of the present invention, a second metal line 152 is further disposed on the first substrate 110. An orthographic projection of the second metal line 152 on a plane where the scan lines 111 are located falls on the scan lines 111. A voltage difference between the second metal line 152 and the common electrode 121 is $V_2$, and $V_2=V_1$. That is, a liquid crystal molecule 131 corresponding to the second metal line 152 does not deflect ($V_2=0$ V) or deflects by only a small angle ($-1\ V \le V_2 \le 1\ V$), and appears in a black and opaque state macroscopically. In this way, the second metal line 152 shields light leaked at the scan lines 111. The second metal line 152 is connected in series with the first metal line 151, and the first metal line 151 is connected in series with the second metal line 152, so as to form a T-shaped structure.

In still another embodiment of the present invention, a third metal line 153 is further disposed on the first substrate 110. An orthographic projection of the third metal line 153 on a plane where the data lines 112 are located falls on the data lines 112. That is, a length of the third metal line 153 corresponds to a length of the data lines 112, and a width of the third metal line 153 is slightly greater than or equal to a width of the data lines 112. A voltage difference between the third metal line 153 and the common electrode 121 is $V_3$, and $V_3=V_1$. That is, a liquid crystal molecule 131 corresponding to the third metal line 153 does not deflect ($V_3=0$ V) or deflects by only a small angle ($-1\ V \le V_3 \le 1\ V$), and appears in a black and opaque state macroscopically. In this way, the third metal line 153 shields light leaked at the data lines 112. The third metal line 153 is connected in series with the second metal line 152.

In an embodiment of the present invention, the first metal line 151, the second metal line 152, and the third metal line 153 are disposed in the same layer, that is, an indium tin oxide (ITO) layer of the first substrate 110. The first metal line 151, the second metal line 152, and the third metal line 153 are ITO electrodes. In other embodiments, the first metal line 151, the second metal line 152, and the third metal line 153 are one of the following electrodes: an indium zinc oxide (IZO) electrode, an indium oxide ($In_2O_3$) electrode, a tin oxide ($SnO_2$) electrode, a zinc oxide ZnO electrode, a cadmium oxide CdO electrode, or an aluminum-doped zinc oxide AZO electrode.

At least one thin film transistor 160 is disposed in each pixel unit 140. A gate of the thin film transistor 160 is connected to the scan lines 111, a source is connected to the data lines 112, and a drain is connected to the outer frame portion 142 through the via 161.

The pixel electrode 141 has 4 domains (referring to FIG. 2) or 8 domains (not shown in the figure). If the pixel electrode 141 has 8 domains, the pixel electrode is divided into a primary region and a secondary region. The first metal line 151 may cover the first trunk electrode located in the primary region and/or the first trunk electrode located in the secondary region. The first substrate 110 is an array substrate, and the second substrate 120 is a color filter substrate.

In conclusion, although exemplary embodiments of this application have been disclosed above, the exemplary embodiment are not intended to limit this application. A person of ordinary skill in the art can make various modifications and embellishments without departing from the spirit and scope of this application. Therefore, the protection scope of this application falls within the scope defined by the claims.

What is claimed is:

1. A liquid crystal display panel, comprising a first substrate and a second substrate disposed opposite to each other, wherein a liquid crystal layer is disposed between the first substrate and the second substrate and comprises a plurality of liquid crystal molecules, a common electrode is disposed on a side of the second substrate facing the first substrate, a plurality of scan lines and a plurality of data lines are disposed on the first substrate, and the scan lines and the data lines intersect to define a plurality of pixel units; and
a pixel electrode is disposed in each pixel unit, the pixel electrode comprises a trunk electrode and a plurality of branch electrodes, and the trunk electrode comprises a first trunk electrode and a second trunk electrode intersecting each other,
wherein a first metal line is disposed on the first substrate, an orthographic projection of the first metal line on a plane where the pixel electrode is located covers at least part of the first trunk electrode, and a voltage difference between the common electrode and the first metal line causes a liquid crystal molecule corresponding to the first metal line to be in an opaque state;
wherein the voltage difference between the common electrode and the first metal line is $V_1$, and $-1 V \leq V_1 \leq +1$ V;
wherein a second metal line configured to shield light leaked at the scan lines is disposed on the first substrate, an orthographic projection of the second metal line on a plane where the scan lines are located falls on the scan lines, a voltage difference between the second metal line and the common electrode is $V_2$, and $V_2=V_1$;
wherein a third metal line configured to shield light leaked at the data lines is disposed on the first substrate, an orthographic projection of the third metal line on a plane where the data lines are located covers the data lines, the third metal line is connected in series with the second metal line, a voltage difference between the third metal line and the common electrode is $V_3$, and $V_3=V_1$;
wherein the first metal line, the second metal line, and the third metal line are disposed in the same layer.

2. The liquid crystal display panel according to claim 1, wherein a deflection angle of the liquid crystal molecule corresponding to the first metal line ranges from −2° to 2°.

3. The liquid crystal display panel according to claim 1, wherein a length of the first metal line is 0.5-1 times a length of the pixel electrode.

4. The liquid crystal display panel according to claim 3, wherein a width of the first metal line is greater than or equal to a width of the first trunk electrode.

5. The liquid crystal display panel according to claim 1, wherein the first metal line is connected in series with the second metal line.

6. The liquid crystal display panel according to claim 1, wherein a width of the third metal line is greater than or equal to a width of the data lines.

7. A display device, comprising a liquid crystal display panel, wherein
the liquid crystal display panel comprises:
a first substrate and a second substrate disposed opposite to each other, wherein a liquid crystal layer is disposed between the first substrate and the second substrate and comprises a plurality of liquid crystal molecules, a common electrode is disposed on a side of the second substrate facing the first substrate, a plurality of scan lines and a plurality of data lines are disposed on the first substrate, and the scan lines and the data lines intersect to define a plurality of pixel units; and
a pixel electrode is disposed in each pixel unit, the pixel electrode comprises a trunk electrode and a plurality of branch electrodes, and the trunk electrode comprises a first trunk electrode and a second trunk electrode intersecting each other,
wherein a first metal line is disposed on the first substrate, an orthographic projection of the first metal line on a plane where the pixel electrode is located covers at least part of the first trunk electrode, and a voltage difference between the common electrode and the first metal line causes a liquid crystal molecule corresponding to the first metal line to be in an opaque state;
wherein the voltage difference between the common electrode and the first metal line is $V_1$, and $-1 V \leq V_1 \leq +1$ V;
wherein a second metal line configured to shield light leaked at the scan lines is disposed on the first substrate, an orthographic projection of the second metal line on a plane where the scan lines are located falls on the scan lines, a voltage difference between the second metal line and the common electrode is $V_2$, and $V_2=V_1$;
wherein a third metal line configured to shield light leaked at the data lines is disposed on the first substrate, an orthographic projection of the third metal line on a plane where the data lines are located covers the data lines, the third metal line is connected in series with the second metal line, a voltage difference between the third metal line and the common electrode is $V_3$, and $V_3=V_1$;

wherein the first metal line, the second metal line, and the third metal line are disposed in the same layer.

8. The display device according to claim 7, wherein a deflection angle of the liquid crystal molecule corresponding to the first metal line ranges from −2° to 2°.

9. The display device according to claim 7, wherein a length of the first metal line is 0.5-1 times a length of the pixel electrode.

10. The display device according to claim 9, wherein a width of the first metal line is greater than or equal to a width of the first trunk electrode.

11. The display device according to claim 7, wherein the first metal line is connected in series with the second metal line.

12. The display device according to claim 7, wherein a width of the third metal line is greater than or equal to a width of the data lines.

* * * * *